(12) United States Patent
Chen

(10) Patent No.: US 7,789,130 B2
(45) Date of Patent: Sep. 7, 2010

(54) SYSTEM AIR FANS IN INTEGRATED CONTROL APPARATUS

(75) Inventor: Michael Chen, Taipei Hsien (TW)

(73) Assignee: Topower Computer Industrial Co., Ltd., Xindian, Taipei Hsien (TW)

( * ) Notice: Subject to any disclaimer, the term of this patent is extended or adjusted under 35 U.S.C. 154(b) by 853 days.

(21) Appl. No.: 11/648,791

(22) Filed: Jan. 3, 2007

(65) Prior Publication Data
US 2008/0159845 A1   Jul. 3, 2008

(51) Int. Cl.
*F24F 11/06*   (2006.01)
(52) U.S. Cl. ............... 165/247; 165/122; 236/49.1; 361/695; 713/300
(58) Field of Classification Search ........... 165/121, 165/122, 244, 247; 236/49.1, 49.2; 361/695, 361/696, 697, 699; 318/471; 713/300
See application file for complete search history.

(56) References Cited

U.S. PATENT DOCUMENTS

| | | | | |
|---|---|---|---|---|
| 5,564,831 | A * | 10/1996 | Bashark | 374/141 |
| 5,731,954 | A * | 3/1998 | Cheon | 361/699 |
| 5,872,983 | A * | 2/1999 | Walsh et al. | 713/300 |
| 6,188,189 | B1 * | 2/2001 | Blake | 318/471 |
| 6,891,347 | B2 * | 5/2005 | Dobbs et al. | 318/471 |
| 7,196,903 | B2 * | 3/2007 | Vuong et al. | 361/695 |
| 7,714,731 | B2 * | 5/2010 | Palaszewski | 236/49.2 |

FOREIGN PATENT DOCUMENTS

TW      200619900 A      6/2006

* cited by examiner

*Primary Examiner*—Ljiljana (Lil) V Ciric
(74) *Attorney, Agent, or Firm*—Muncy, Geissler, Olds & Lowe, PLLC

(57) ABSTRACT

A system air fans integrated control apparatus for a computer system which has a plurality of heat sources and a plurality of air fans corresponding to the heat sources includes a plurality of detection units to detect the heat sources and output a plurality of temperature alteration parameter signals, a signal integration and determination circuit to receive and interpret the temperature alteration parameter signals to determine a rotation speed regulation signal, and an air fan driving circuit which is linked to the signal integration and determination circuit and an external driving power source. Upon receiving the rotation speed regulation signal the driving power of the external driving power source to the air fans is regulated synchronously. Thereby multiple heat sources are detected at the same time and multiple air fans are integrated to perform heat dissipating to reduce accumulating heat in the system environment.

11 Claims, 5 Drawing Sheets

SYSTEM AIR FANS IN INTEGRATED CONTROL APPARATUS

FIELD OF THE INVENTION

The present invention relates to an air fan control apparatus and particularly to a system air fans integrated control apparatus to detect a plurality of heat sources and integrate a plurality of system air fans to dissipate heat synchronously to effectively reduce accumulating heat in a system environment.

BACKGROUND OF THE INVENTION

With the advance of precision technology the size of electronic devices such as personal computers shrinks gradually but performance increases constantly. Heat dissipating of the electronic devices become a serious problem. R.O.C. patent publication No. 200619900 discloses a temperature sensitive radiator that has a temperature detection circuit containing a thermal sensitive resistor or other temperature sensitive elements to constantly detect temperature alterations of the heat source of an electronic device during operation. In the event that the temperature of the heat source exceeds a preset temperature level a signal is issued to a driving circuit to increase the rotation speed of the radiator to increase the heat dissipating effect.

However the approach mentioned above can no longer meet the requirements of the present electronic devices. For instance a generally personal computer has many heat sources, such as power supply, CPU, hard disk drives, display cards and chassis and the like. A plurality of air fans have to be installed corresponding to the heat sources to reduce the temperature thereof. In the conventional air fan control architecture when a higher temperature of one heat source is detected the rotation speed of one air fan is regulated through the driving power. But temperature increase of one heat source often causes a higher temperature in the entire system environment due to thermal convection. The conventional air fan design does not take into account of the adverse effect caused by the accumulating heat of the environment. Each air fan is responsible for heat dissipating of a single heat source. The rotation speeds of the air fans in the system are not controlled integrally (for instance the rotation speed of the air fan for the chassis also has to be increased to dissipate the heated air outside the chassis). As a result, thermal convection tends to make the temperature of the entire system higher and total heat dissipating efficiency is affected. The problem of the accumulating heat in the environment remains unresolved.

SUMMARY OF THE INVENTION

The primary object of the present invention is to provide a system air fans integrated control apparatus that can concurrently detect a plurality of heat sources and integrate a plurality of air fans in the system to perform heat dissipating simultaneously to effectively reduce the heat accumulating problem in the system environment.

To achieve the foregoing object, a preferred embodiment of the invention includes a plurality of detection units to detect a plurality of heat sources and output a plurality of temperature alteration parameter signals, a signal integration and determination circuit to receive and interpret the temperature alteration parameter signals to determine a rotation speed regulation signal, and an air fan driving circuit connecting to the signal integration and determination circuit and an external driving power source. Upon receiving the rotation speed regulation signal the driving power of the external driving power source to the air fans is synchronously adjusted. Thereby multiple heat sources can be detected at the same time and multiple air fans of the system can be integrated to synchronously dissipate heat.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3 is a perspective view of the present invention.

DETAILED DESCRIPTION OF THE PREFERRED EMBODIMENTS

Figure 1:
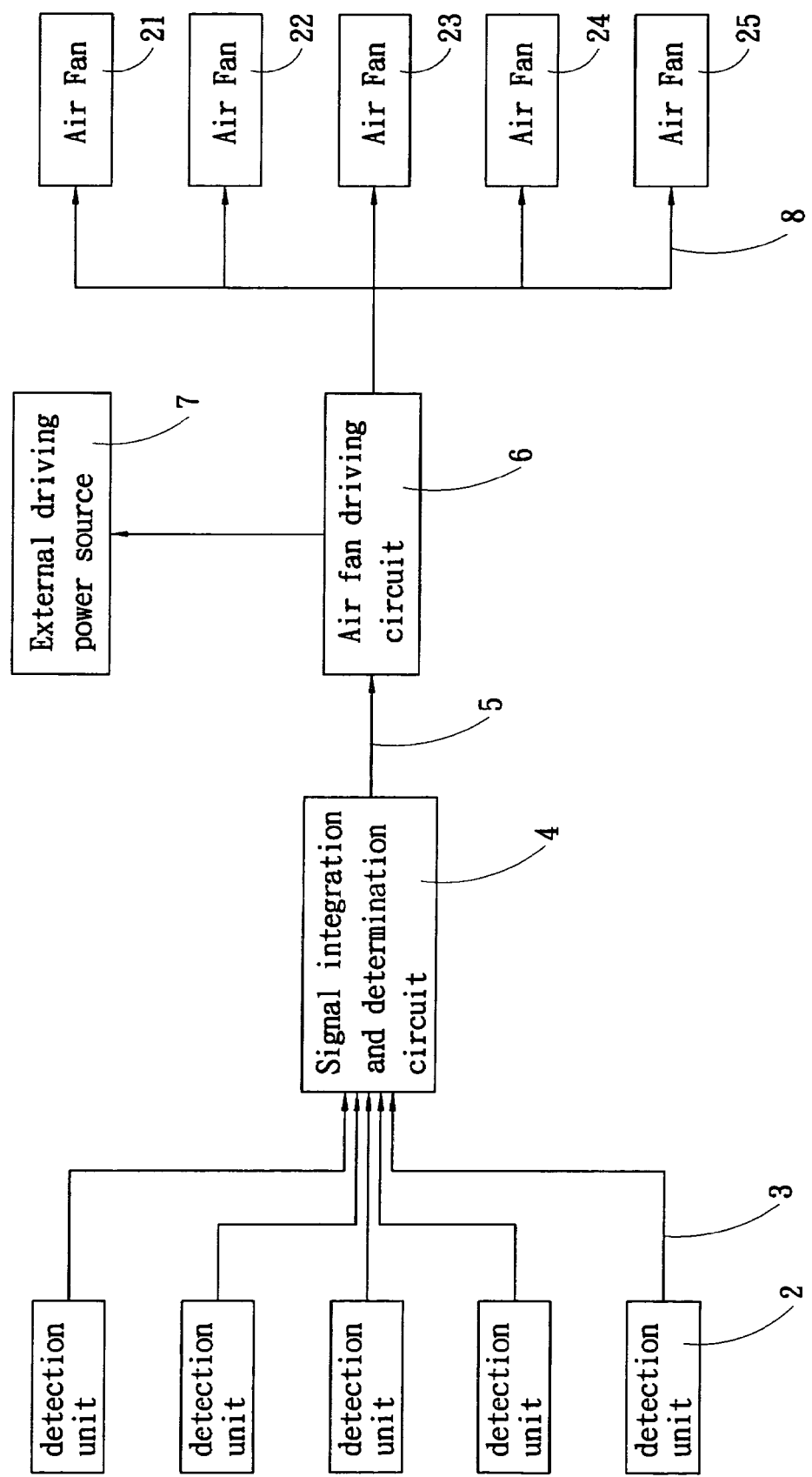
FIG. 1 is a circuit block diagram of an embodiment of the invention.
Figure 3:
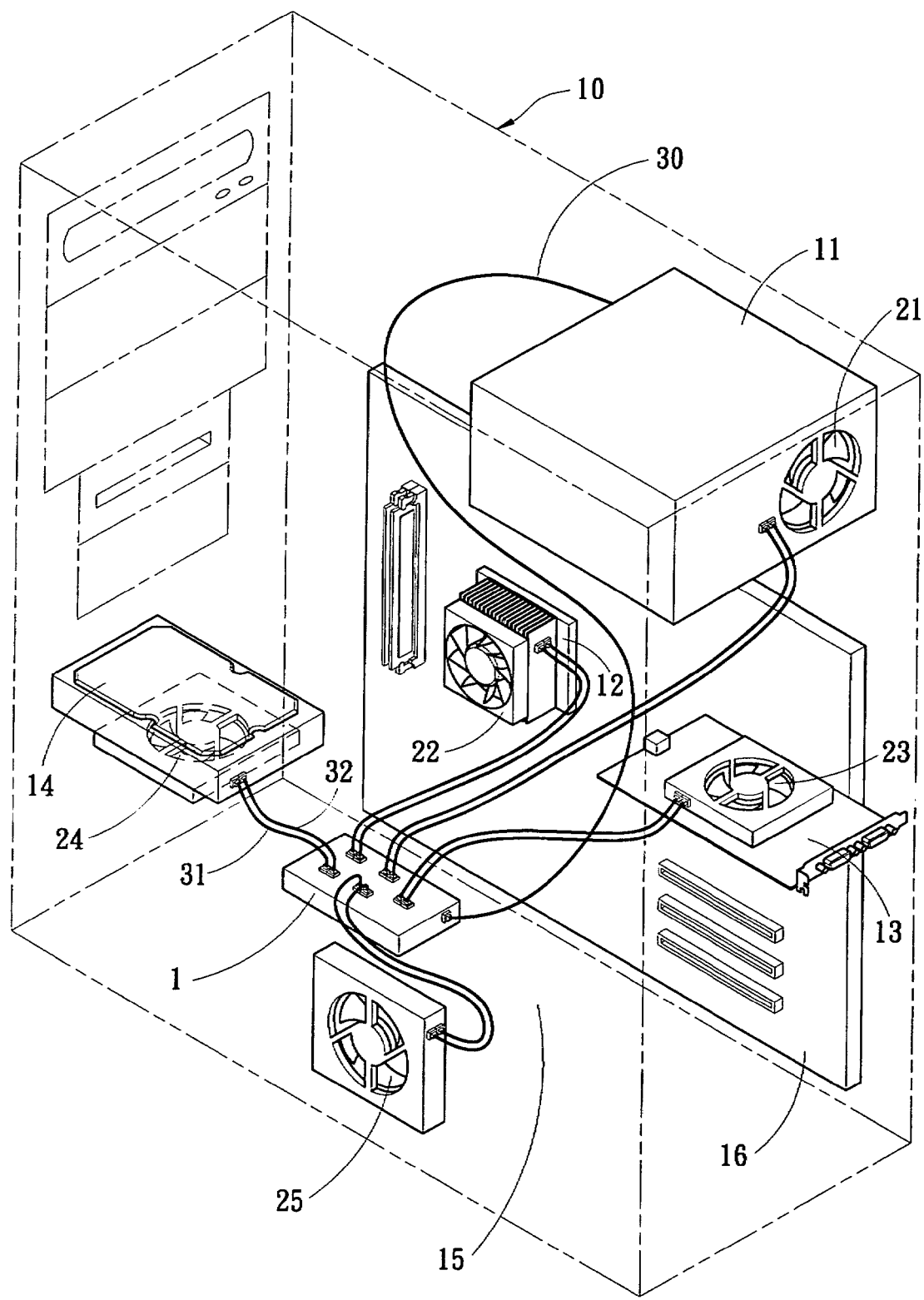
FIG. 3 is a schematic view of the structure of an embodiment of the invention.

Please refer to FIGS. 1 and 3 for an embodiment of the invention. The system air fans integrated control apparatus of the invention is adopted for use on a compute system 10 that has a plurality of heat sources 11-15 and a plurality of air fans 21-25 to perform heat dissipating for the heat sources 11-15. The heat sources 11-15 may include (but not limit to) a power supply, CPU, display cards, hard disk drives or computer system interior. The system air fans integrated control apparatus 1 includes:

a plurality of detection units 2 which are thermal resistors installed on the heat sources 11-15 to perform detection and output a plurality of temperature alteration parameter signals 3;

a signal integration and determination circuit 4 which may be a micro-control unit (MCU) linking to the detection units 2 to receive the temperature alteration parameter signals 3. It has a signal integration means to interpret the temperature alteration parameter signals 3 and determine a rotation speed regulation signal 5. The rotation speed regulation signal 5 is formed by taking the maximum parameter value of the temperature alteration parameter signals 3, or by taking the average value of the temperature alteration parameter signals 3; and an air fan driving circuit 6 which is connected to the signal integration and determination circuit 4 and an external power source 7 to receive the rotation speed regulation signal 5 to synchronously regulate driving power 8 of the external power source 7 to the air fans 21-25.

Figure 2:
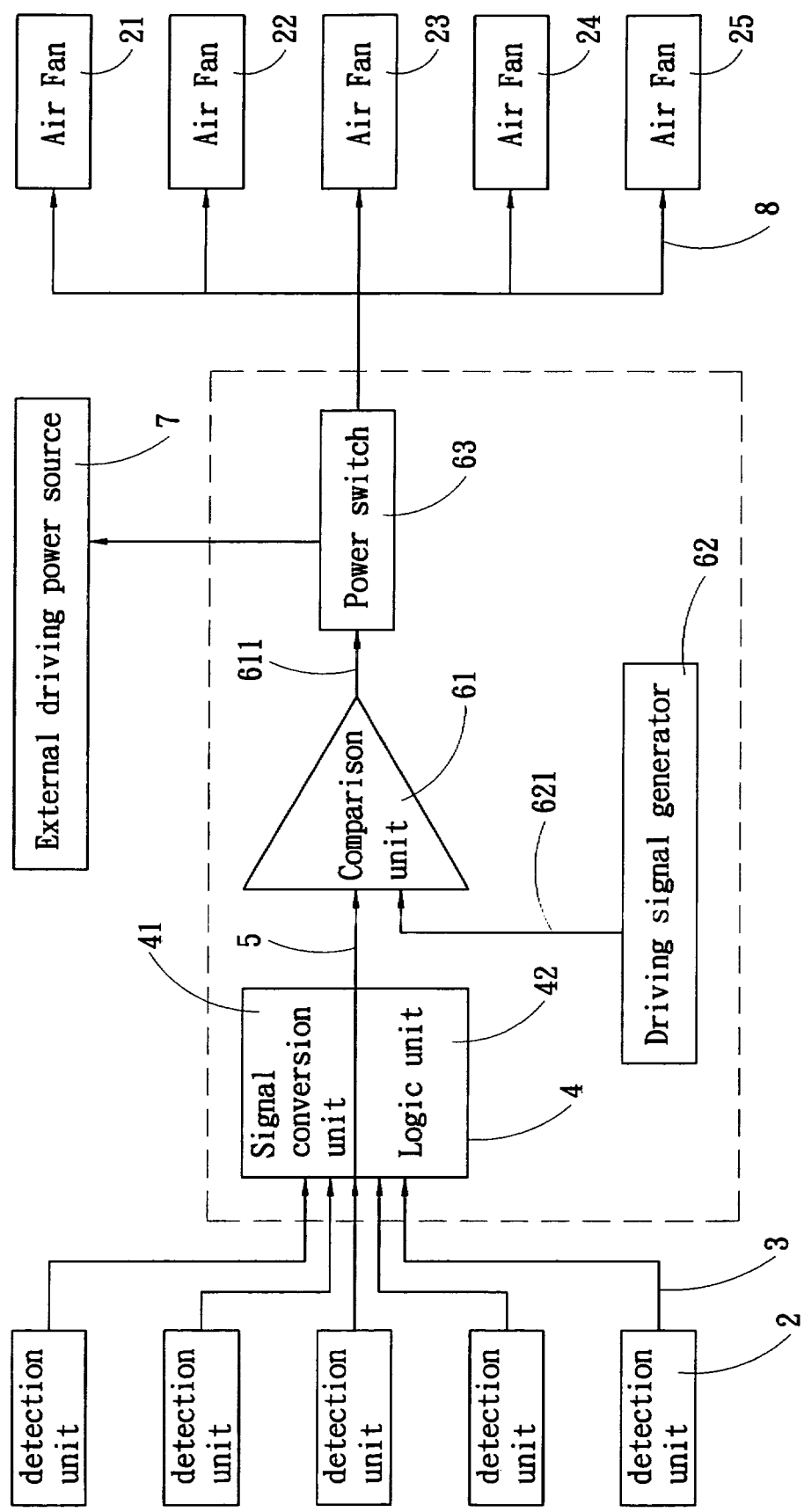
FIG. 2 is another circuit block diagram of an embodiment of the invention.

Referring to FIG. 2 for the circuit block diagram of an embodiment of the invention. The signal integration and determination circuit 4 includes a signal conversion unit 41 (such as an integration circuit) to integrate and calculate the temperature alteration parameter signals 3 and a logic unit 42 (such as an OR gate) to establish a parameter level to sift the temperature alteration parameter signals 3 and generate the rotation speed regulation signal 5. The air fan driving circuit 6 has a comparison unit 61 connecting to a driving signal generator 62. The rotation speed regulation signal 5 serves as a level to correct a driving signal 621 output from the driving signal generator 62 to generate an air fan rotation speed signal 611 to a power switch 63. The power switch 63 determines the driving power 8 of the external driving power source 7 to the air fans 21-25 based on the air fan rotation speed signal 611.

Figure 4:
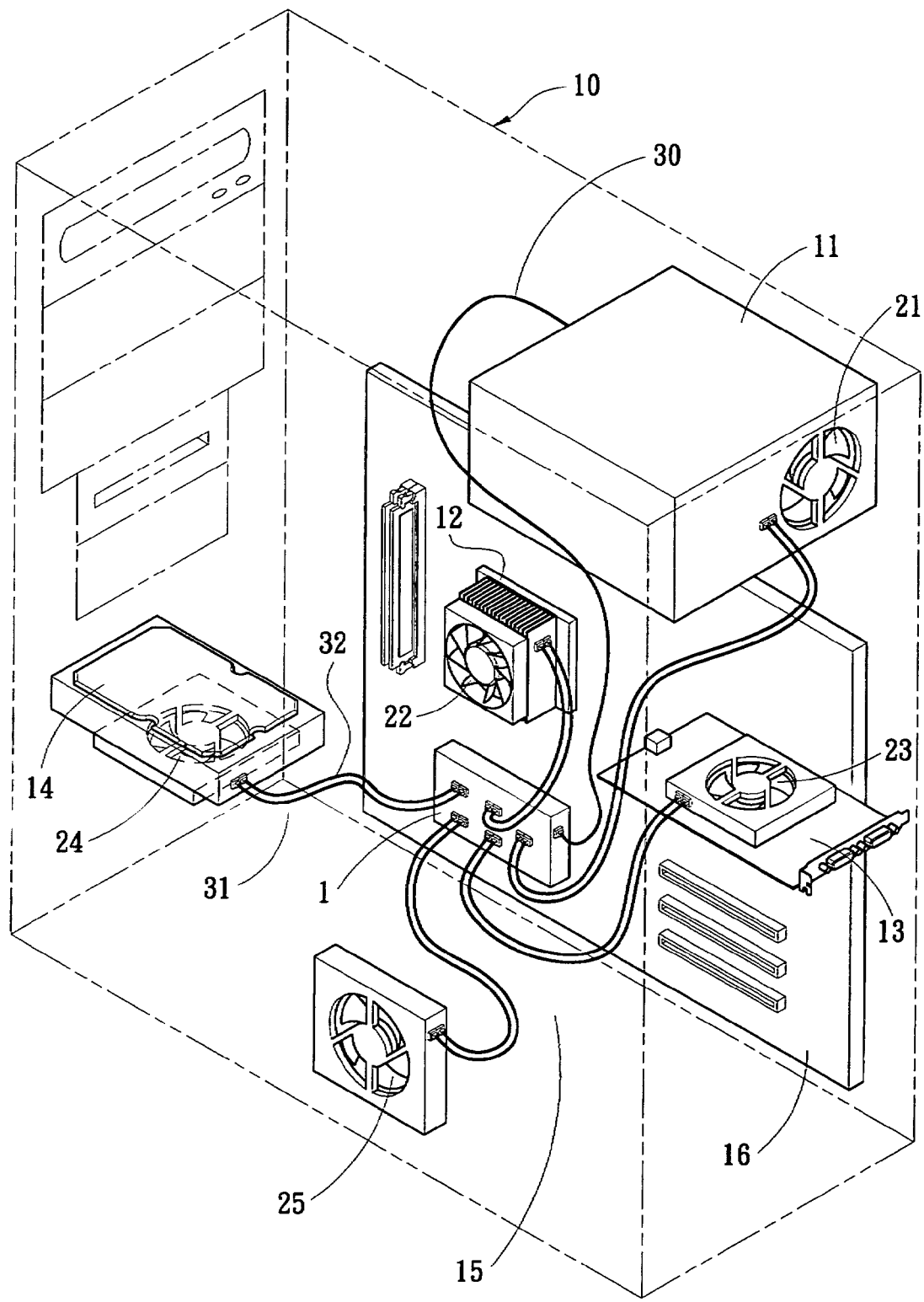
FIG. 4 is a schematic view of the structure of a second embodiment of the invention.
Figure 5:
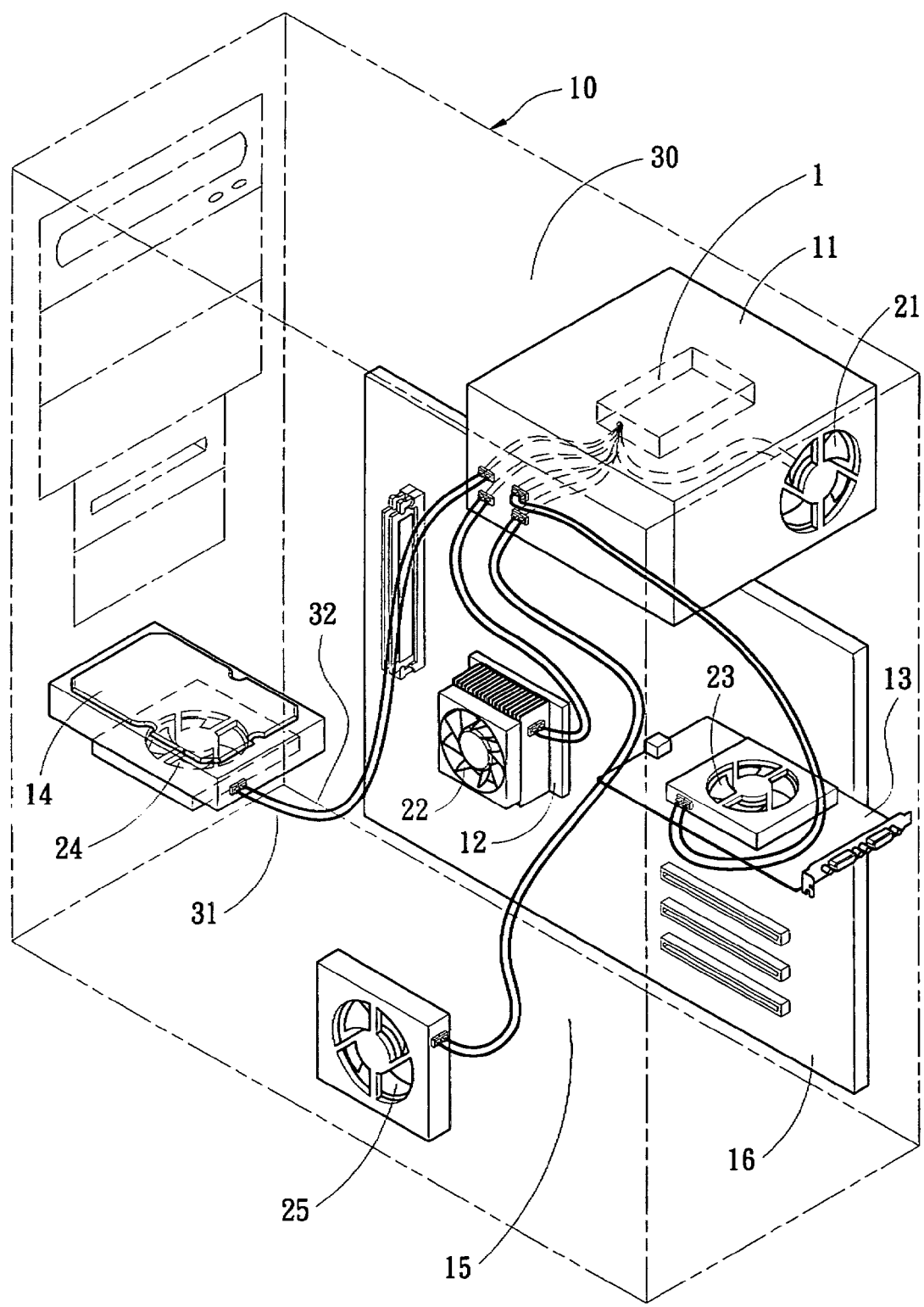
FIG. 5 is a schematic view of the structure of a third embodiment of the invention.

Implementation of the system air fans integrated control apparatus 1 is not limited to the external controller as shown in FIG. 3. FIG. 4 illustrates a structure located on a motherboard 16, and FIG. 5 depicts a structure located in a power supply (heat source 11) inside the computer system 10. No matter where the system air fans integrated control apparatus 1 is located, it has a main power cord 30 linking to the power supply to get electric power, and a signal transmission line 31 connecting to the air fans 21-25 to transmit the temperature alteration parameter signals 3, and a power transmission line 32 to deliver the driving power 8.

In short, the system air fans integrated control apparatus 1 of the invention can detect multiple heat sources 11-15 and synchronously regulate the driving power 8 of the external power source 7 to multiple air fans 21-25 so that the air fans 21-25 are integrally controlled to perform heat dissipating synchronously. Thus the accumulating heat of the system environment can be reduced more effectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A system air fans integrated control apparatus for a computer system which has a plurality of heat sources and a plurality of air fans to reduce the temperature of the heat sources, comprising:

a plurality of detection units installed on the heat sources to detect the heat sources and output a plurality of temperature alteration parameter signals;

a signal integration and determination circuit which is connected to the detection units to receive the temperature alteration parameter signals and has a signal integration means to interpret the temperature alteration parameter signals and determine a rotation speed regulation signal; and an air fan driving circuit which is connected to the signal integration and determination circuit and an external driving power source to receive the rotation speed regulation signal to synchronously regulate driving power of the external driving power source to the air fans.

2. The system air fans integrated control apparatus of claim 1, wherein the detection units are thermal resistors.

3. The system air fans integrated control apparatus of claim 1, wherein the signal integration and determination circuit includes a signal conversion unit to integrate and calculate the temperature alteration parameter signals and a logic unit to establish a parameter level to sift the temperature alteration parameter signals and generate the rotation speed regulation signal.

4. The system air fans integrated control apparatus of claim 1, wherein the rotation speed regulation signal is taken from a maximum value of the temperature alteration parameter signals.

5. The system air fans integrated control apparatus of claim 1, wherein the rotation speed regulation signal is taken from an average value of the temperature alteration parameter signals.

6. The system air fans integrated control apparatus of claim 1, wherein the air fan driving circuit includes a comparison unit which receives the rotation speed regulation signal and is connected to a driving signal generator that uses the rotation speed regulation signal as a level to correct a driving signal output from the driving signal generator to generate an air fan rotation speed signal to a power switch, the power switch determining the driving power of the external driving power source to the air fans based on the air fan rotation speed signal.

7. The system air fans integrated control apparatus of claim 1, wherein the signal integration and determination circuit is a micro-control unit.

8. The system air fans integrated control apparatus of claim 1, wherein the system air fans integrated control apparatus is located on a motherboard of the computer system.

9. The system air fans integrated control apparatus of claim 1, wherein the system air fans integrated control apparatus is located in the interior of a power supply of the interior of the computer system.

10. The system air fans integrated control apparatus of claim 1, wherein the system air fans integrated control apparatus is an external controller.

11. The system air fans integrated control apparatus of claim 1, wherein the heat source can be a power supply, a central processing unit, a display card, a hard disk drive, or the interior of the computer system.

* * * * *